US008732833B2

(12) United States Patent
Choi et al.

(10) Patent No.: US 8,732,833 B2
(45) Date of Patent: May 20, 2014

(54) TWO-STAGE INTRUSION DETECTION SYSTEM FOR HIGH-SPEED PACKET PROCESSING USING NETWORK PROCESSOR AND METHOD THEREOF

(75) Inventors: Young-Han Choi, Daejeon (KR); Deok-Jin Kim, Daejeon (KR); Sung-Ryoul Lee, Seoul (KR); Man-Hee Lee, Daejeon (KR); Byung-Chul Bae, Daejeon (KR); Sang-Woo Park, Daejeon (KR); E-Joong Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 54 days.

(21) Appl. No.: 13/452,894

(22) Filed: Apr. 22, 2012

(65) Prior Publication Data

US 2013/0160122 A1 Jun. 20, 2013

(30) Foreign Application Priority Data

Dec. 15, 2011 (KR) ........................ 10-2011-0135926

(51) Int. Cl.
| | | |
|---|---|---|
| G06F 11/00 | (2006.01) | |
| G06F 12/14 | (2006.01) | |
| G06F 12/16 | (2006.01) | |
| G08B 23/00 | (2006.01) | |

(52) U.S. Cl.
USPC ........................................... 726/23; 380/243

(58) Field of Classification Search
USPC ........................................................ 726/23
See application file for complete search history.

(56) References Cited

U.S. PATENT DOCUMENTS

| 7,433,357 | B2 * | 10/2008 | Oh et al. ........................ 370/392 |
| 7,971,053 | B2 * | 6/2011 | Norton et al. ................. 713/153 |
| 8,037,517 | B2 * | 10/2011 | Fulp et al. ........................ 726/11 |
| 8,108,929 | B2 * | 1/2012 | Agrawal et al. ................. 726/23 |
| 8,331,229 | B1 * | 12/2012 | Hu et al. ........................ 370/230 |

(Continued)

FOREIGN PATENT DOCUMENTS

| KR | 10-2004-0056998 A | 7/2004 |
| KR | 10-2009-0059781 A | 6/2009 |
| KR | 10-2009-0076612 A | 7/2009 |
| KR | 10-2010-0071763 A | 6/2010 |
| KR | 10-2010-0076836 A | 7/2010 |

OTHER PUBLICATIONS

Ke Wang, H; Anomalous Payload-based Network Intrusion Detection; Year:2004 Springer; pp. 1-20.*

(Continued)

Primary Examiner — Mohammad W Reza
Assistant Examiner — Monjour Rahim
(74) Attorney, Agent, or Firm — LRK Patent Law Firm

(57) ABSTRACT

A system and method for detecting network intrusion by using a network processor are provided. The intrusion detection system includes: a first intrusion detector, configured to use a first network processor to perform intrusion detection on layer 3 and layer 4 of a protocol field among information included in a packet header of a packet transmitted to the intrusion detection system, and when no intrusion is detected, classify the packets according to stream and transmit the classified packets to a second intrusion detector; and a second intrusion detector, configured to use a second network processor to perform intrusion detection through deep packet inspection (DPI) for the packet payload of the packets transmitted from the first intrusion detector. Thereby, intrusion detection for high-speed packets can be performed in a network environment.

15 Claims, 3 Drawing Sheets

(56) References Cited

U.S. PATENT DOCUMENTS

2008/0101371 A1* 5/2008 Law et al. .................... 370/392
2009/0213858 A1* 8/2009 Dolganow et al. ......... 370/395.5
2009/0300153 A1* 12/2009 Ray et al. ..................... 709/223
2010/0158009 A1* 6/2010 Lee et al. ..................... 370/392
2010/0172257 A1* 7/2010 Yu ................................ 370/252
2012/0106338 A1* 5/2012 Pongracz et al. ............. 370/235

OTHER PUBLICATIONS

Haoyu Song et al. "Snort Offloader: A Reconfigurable Hardware NIDS Filter," IEEE, 2005.

* cited by examiner

TWO-STAGE INTRUSION DETECTION SYSTEM FOR HIGH-SPEED PACKET PROCESSING USING NETWORK PROCESSOR AND METHOD THEREOF

CROSS-REFERENCE TO RELATED APPLICATION

This application claims priority to Korean Patent Application No. 10-2011-0135926 filed on Dec. 15, 2011, which is incorporated herein by reference in its entirety.

BACKGROUND OF THE INVENTION

1. Field of the Invention

Exemplary embodiments of the present invention relate to a system and a method for detecting network intrusion using a network processor. In particular, exemplary embodiments of the present invention relate to a technology for performing intrusion detection by dividing processing of a packet header and a packet payload of a packet, input through a network, into two stages to perform high-speed packet processing.

2. Description of Related Art

When transmitting and receiving data through a network, an intrusion detection system for monitoring network traffic has been used so as to intercept network intrusion operations, such as Denial of Service attacks (DoS attacks), port scans, computer crack attempts, and the like, into a predetermined device that is connected to a network.

The intrusion detection system reads all of the packets to be received and searches for dubious patterns. That is, for example, when a very large number of TCP connection requests find a pattern whereby connection attempts using various ports are made, it is possible to detect that port scanning is being attempted by a third party.

However, when a high-speed packet transmitted through a network is processed, packets may be leaked. Therefore, the related art has a problem in that intrusion detection for traffic including all packets is not performed. Further, in order to overcome this problem, a method for distributing network traffic (KR Patent Application No. 10-2009-0076612: Intrusion detection system and method for cooperative multi-server and intrusion detection control system and method') has been proposed. However, this distribution method may not decrease the amount of traffic to be processed.

SUMMARY OF THE INVENTION

An embodiment of the present invention is directed to a two-stage intrusion detection system and method for performing intrusion detection using network processing after a packet is divided into a packet header and a packet payload for high-speed packet processing.

In addition, the embodiment of the present invention performs intrusion detection in parallel through a plurality of network processors in the case in which intrusion detection is performed on a packet payload, which imposes a large load. Therefore, the embodiment of the present invention is directed to a system that is capable of detecting network intrusion without leakage of packets in a high-speed network environment such as a backbone.

Other objects and advantages of the present invention can be understood by the following description, and will become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an intrusion detection system includes: a first intrusion detector, configured to use a first network processor to perform intrusion detection on layer 3 and layer 4 of a protocol field, among information included in a packet header of a packet transmitted to the intrusion detection system, and when no intrusion is detected, classify the packets according to stream and transmit the classified packets to a second intrusion detector; and a second intrusion detector, configured to use a second network processor to perform intrusion detection through deep packet inspection (DPI) for the packet payload of the packets transmitted from the first intrusion detector.

In accordance with another embodiment of the present invention, an intrusion detection method of an intrusion detection system includes: a first intrusion detector and a second intrusion detector, the intrusion detection method including: performing intrusion detection on layer 3 and layer 4 of a protocol field among information included in a packet header of a packet transmitted to the intrusion detection system by allowing the first intrusion detector to use a first network processor; classifying the packets according to stream by the first intrusion detector, and transmitting the classified packets to the second intrusion detector when no intrusion is detected as a result of performing the intrusion detection; and performing intrusion detection through deep packet inspection (DPI) for a packet payload of the packet transmitted from the first intrusion detector by allowing the second intrusion detector to use a second network processor.

DESCRIPTION OF SPECIFIC EMBODIMENTS

Figure 1:
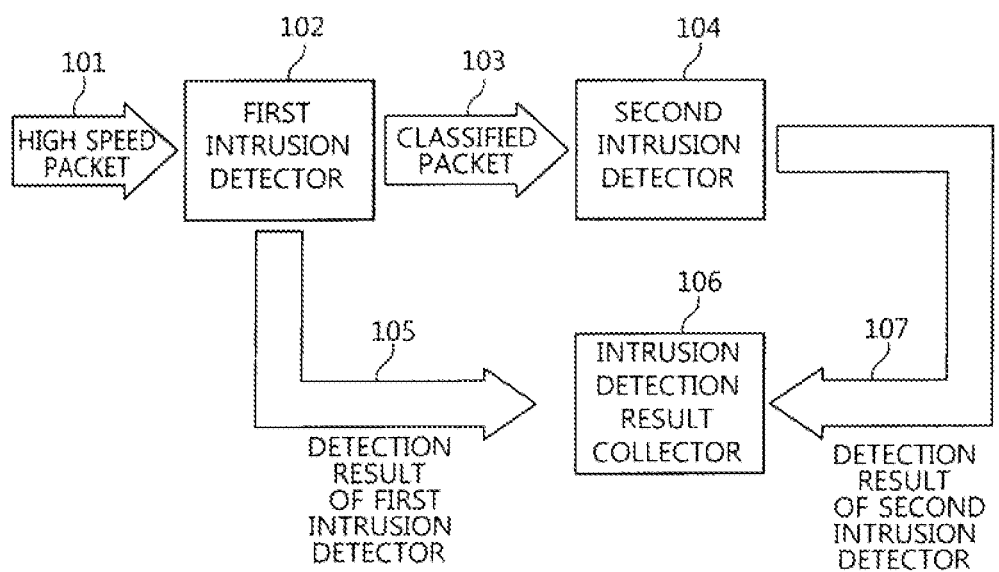
FIG. 1 illustrates a configuration for performing intrusion detection according to an embodiment of the present invention.

Exemplary embodiments of the present invention will be described below in more detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale, and in some instances, proportions may have been exaggerated in order to clearly illustrate features of the embodiments. When a first layer is referred to as being "on" a second layer or "on" a substrate, it not only refers to the case where the first layer is formed directly on the second layer or the substrate, but also to the case where a third layer exists between the first layer and the second layer or the substrate.

FIG. 1 illustrates a schematic configuration for performing intrusion detection in accordance with an embodiment of the present invention.

The embodiment of the present invention includes a first intrusion detector 102 and a second intrusion detector 104 for dividing a transmitted packet into a packet header and a packet payload for high-speed packet 101 processing, thereby performing two-stage intrusion detection.

An intrusion detection system may transmit and receive data including a packet through a network interface. In addition, the network may include an intranet network, an interne network, or the like, wherein the network interface may support wired and wireless network connection.

Therefore, when the high speed packet 101 is transmitted to the intrusion detection system through the network, the intrusion detection system first performs intrusion detection on the packet header of the transmitted packet using the first intrusion detector 102, classifies (103) the packet according to stream when no intrusion is detected, and transmits the classified packet to the second intrusion detector 104.

Next, the second intrusion detector 104 performs intrusion detection on the packet payload of the transmitted packet.

In addition, data on intrusive packets and non-intrusive packets can be collected by storing an intrusion detection result 105 for the packet header of the first intrusion detector 102 and an intrusion detection result 107 for the packet payload of the second intrusion detector 104 in an intrusion detection result collector 106, and the collected data may be used for subsequent intrusion detection.

That is, as illustrated in FIG. 1, the process is performed by dividing the header and the payload of the received packet, thereby efficiently performing the intrusion detection operation. The detailed configuration for performing the intrusion detection operation will be described with reference to FIG. 2.

Figure 2:
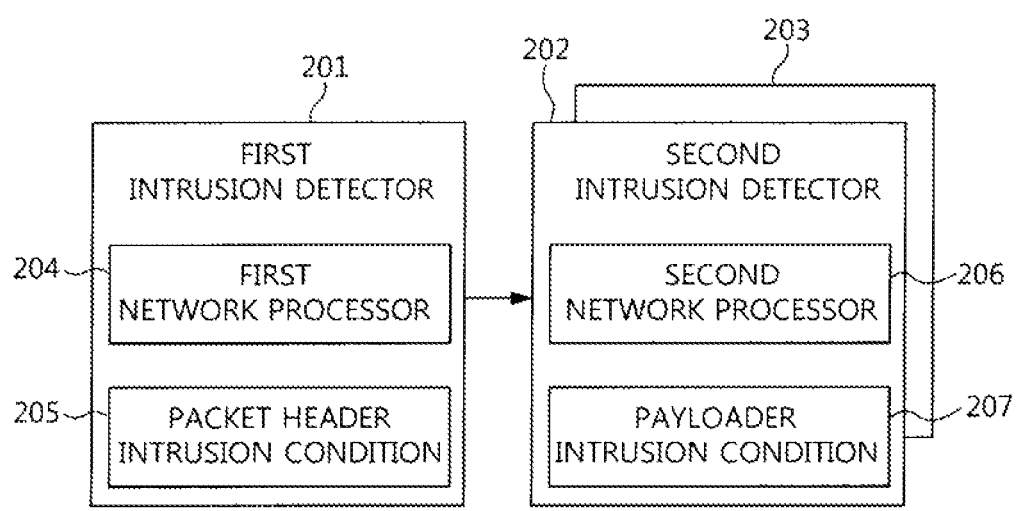
FIG. 2 is a diagram illustrating an intrusion detection system according to an embodiment of the present invention.

FIG. 2 is a diagram illustrating an intrusion detection system in accordance with an embodiment of the present invention.

In accordance with the embodiment of the present invention, an intrusion detection system may include a first intrusion detector 201 and a second intrusion detector 202.

The first intrusion detector may include a first network processor 204 and a packet header intrusion condition 205.

The first network processor 204 is a processor that includes hardware for processing a packet transmitted through a network. In addition, in accordance with the embodiment of the present invention, the intrusion detection system may include, as a first network processor, a network processor for performing high-speed processing on the packet header using a micro code.

For the packet header of the packet received in the intrusion detection system, the first intrusion detector 201 may perform an operation for detecting intrusion through the packet header intrusion condition 205 stored in the first intrusion detector.

That is, the first intrusion detector 201 may perform intrusion detection on the packet header of the transmitted packet to the intrusion detection system by using the first network processor 204, and, when no intrusion is detected, classify the packet according to stream and transmit the classified packet to the second intrusion detector 202.

In addition, in accordance with the embodiment of the present invention, the first intrusion detector 201 analyzes the packet header to inspect whether there is an intrusion pattern in layer 3 and layer 4 of a protocol field, thereby performing intrusion detection for the packet header.

Therefore, the packet header intrusion condition 205 may store information on the intrusion pattern.

The layer described in the detailed description of the embodiment of the present invention may mean a layer according to an open system interconnection (OSI) model 7 layer. That is, for example, layer 3 may mean a third layer according to the OSI model 7 layer, and layer 4 may mean a fourth layer according to the OSI model 7 layer.

Further, the first intrusion detector 201 may generate streams according to 5-tuple based on the packet header information of the packet to again perform intrusion detection for each of the generated streams when the intrusion detection for the packet header based on layer 3 and layer 4 is completed, and may again generate streams according to 2-tuple based on the packet header information of the packet to perform classification according to stream when no intrusion is detected for each of the generated streams.

In accordance with the embodiment of the present invention, the first intrusion detector 201 may generate a stream according to the 5-tuple, which includes a source IP, a destination IP, a source port, a destination port, and a protocol, and may detect a stream that differs from normal network traffic based on the generated stream.

Therefore, the packet header intrusion condition 205 may store information on the flow of normal network traffic.

In addition, the first intrusion detector 201 detects layer 4 DDoS and layer 7 DDoS for the source IP of the stream generated according to the 5-tuple, thereby again performing intrusion detection.

Further, as a result of intrusion detection for the stream, when no intrusion is detected, the packet may be again generated and classified as a 2-tuple, which includes the source IP and the destination IP.

In addition, in accordance with the embodiment of the present invention, classification may be performed according to the stream by adding the final position of the source IP address of the stream generated according to the 2-tuple to the final position of the destination IP and performing a modular operation thereon. That is, the operation may be performed through [Equation 1] and [Equation 2] (X, which is the final position value of the source IP, has a positive integer value between 0 and 255, and Y, which is the final position value of the destination IP, has a positive integer value between 0 and 255. In addition, n represents the number of second intrusion detectors).

$$0 \leq X+Y \leq 510 \quad \text{[Equation 1]}$$

$$(X+Y) \bmod n = \text{PORT\_No} \quad \text{[Equation 2]}$$

That is, the second intrusion detector performs intrusion detection at all times in the case of the same client and server by removing elements that make the source IP and the destination IP different from each other in bidirectional communication by the above operation, thereby improving the efficiency of intrusion detection.

In addition, the second intrusion detector 202 may perform intrusion detection on the packet payload of the transmitted packet in the first intrusion detector using a second network processor 206.

In accordance with the embodiment of the present invention, the second network processor may be a network processor that can perform deep packet inspection (DPI).

Further, the second intrusion detector may store a payload intrusion condition 207 to provide information that is necessary for deep packet inspection to the second network processor 206.

In addition, in accordance with the embodiment of the present invention, the intrusion detection system may include a plurality of second intrusion detectors 202 and 203 connected in parallel. Therefore, the first intrusion detector 201 may transfer the classified packet to different second intrusion detectors according to the classification, and may perform intrusion detection on the packet payload by allowing the plurality of second intrusion detectors to use different network processors, that is, the second network processors 206 included in each of the second intrusion detection systems.

That is, the packet payload, which entails a considerable amount of processing burden, is processed in parallel, thereby performing high-speed packet processing.

Further, the second intrusion detector 204 performs deep packet inspection (DPI) on the packet payload of the packet that was classified and transmitted in the first intrusion detector 203, thereby performing intrusion detection.

Further, the intrusion detection system in accordance with the embodiment of the present invention includes the plurality of microprocessors 206, wherein the first intrusion detector 203 uses a network processor for performing high-speed processing through the micro code, among the plurality of network processors, and the second intrusion detector 204 uses the network processor for applying deep packet inspection (DPI), such that the first intrusion detector uses an efficient network processor so as to perform intrusion detection on the header of the packet and the second intrusion detector uses an efficient network processor for performing intrusion detection on the payload of the packet.

Figure 3:
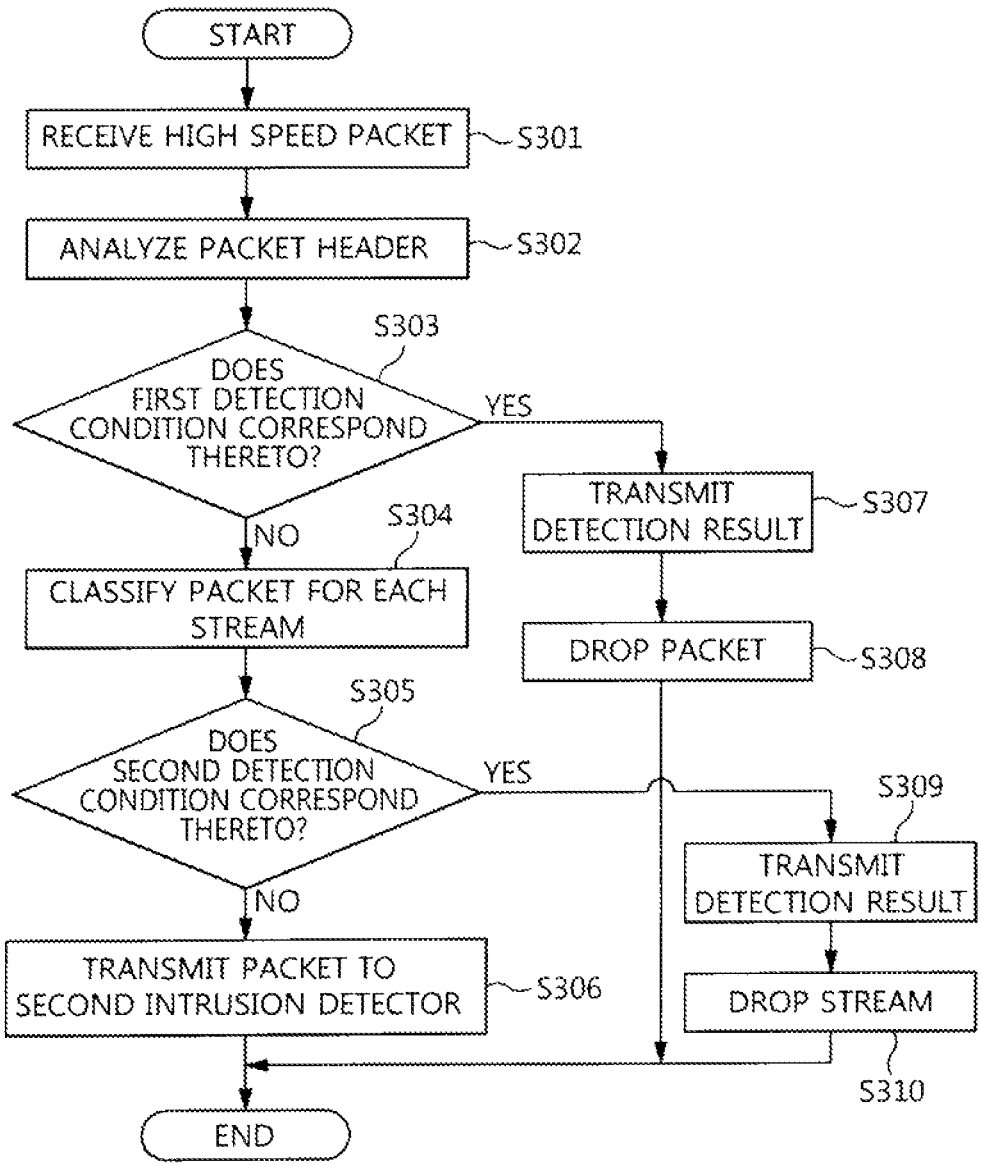
FIG. 3 is a flow chart illustrating an intrusion detection method according to an embodiment of the present invention.

FIG. 3 is a flow chart illustrating an intrusion detection method in accordance with an embodiment of the present invention.

In accordance with the embodiment of the present invention, the first intrusion detector of the intrusion detection system may perform the operation on the intrusion detection through the processes illustrated in FIG. 3.

That is, the high-speed packet is first received in the intrusion detection system (S301).

The reception may be performed through the network interface of the intrusion detection system, and the network may include an internet network, an intranet network, or the like, and the packet may be received through a wired or wireless network.

Next, the first intrusion detector of the intrusion detection system analyzes the packet header of the received packet (S302).

Next, the first intrusion detector determines whether the packet corresponds to a first detection condition (S303).

In accordance with the embodiment of the present invention, the first detection condition may include a condition whereby the packet header of the received packet is analyzed to inspect, whether there is an intrusion pattern in the protocol field of layer 3 and layer 4.

Next, as the determination result (S303), when the result corresponds to the first detection condition, the detection result is transmitted to the intrusion detection result collector of the intrusion detection system (S307), and the packet corresponding to the first detection condition drops (S308).

That is, the second intrusion detector may reduce the burden of performing processing for intrusion detection by dropping the packet.

On the other hand, as the determination result (S303), when the result does not correspond to the first detection condition, the packets are classified for each stream (S304).

That is, in accordance with the embodiment of the present invention, the first intrusion detector may generate and classify packets according to a 5-tuple, which includes a source IP, a destination IP, a source port, a destination port, and a protocol.

Next, the first intrusion detector determines whether the packet corresponds to the second detection condition (S305).

That is, the classified packets are managed within the network processor for each stream, and abnormal network traffic is detected.

In accordance with the embodiment of the present invention, the first intrusion detector may set up the second detection condition, for detecting a stream that differs from normal network traffic based on the stream generated according to the 5-tuple.

Therefore, the first intrusion detector may determine the second detection condition for detecting the layer 4 DDoS and the layer 7 DDoS for the source IP of the stream generated according to the 5-tuple.

Further, the second detection condition may include a threshold for representing the amount of normal network traffic for each stream.

Therefore, the second detection condition includes a threshold for the number of allowable packets for the source IP. The second detection condition may perform detection on the DDoS of the layer 4 and the layer 7. The number of packets on which the layer 4 DDoS detection is performed may be based on a single protocol accessing the source IP within a unit time. That is, for example, high numbers of packets for the same protocols, such as SYN, ICMP, and UDP of TCP, can be detected. Layer 7 DDoS is based on TCP-based communication, and may be detected based on the number of sessions connected in a predetermined time. That is, the first intrusion detector counts a session as having been established when SYN, SYN-ACK, and ACK for the packets are transmitted, and reduces the number of sessions by one when FIN is transmitted. Thereby, when the number of sessions for the destination IP is measured, and an excessive number of sessions is maintained, it may be determined as layer 7 DDoS. The threshold for the session may be determined according to the process capacity of the web server installed in the source IP.

Next, as the determination result (S305), when the result corresponds to the second detection condition, the detection result is transmitted to the intrusion detection result collector of the intrusion detection system (S309), and the stream corresponding to the second detection condition drops (S310).

On the other hand, as the determination result (S305), when the result does not correspond to the second detection condition, the packets are transmitted to the second intrusion detector (S306).

Further, the packet may be again generated and classified as the 2-tuple, which includes the source IP and the destination IP.

That is, when the intrusion for each of the generated streams is not detected, the streams may be again generated according to the 2-tuple based on the packet header information of the packet to perform classification according to the stream, and the packet may be transmitted to the second intrusion detector.

Therefore, when the processes performed in the first intrusion detector illustrated in FIG. 3 are completed, the second intrusion detector may perform intrusion detection on the payload of the packet. Further, intrusion detection of the second intrusion detector may include intrusion detection by performing deep packet inspection (DPI).

In addition, in accordance with the embodiment of the present invention, when the intrusion detection system includes a plurality of second intrusion detectors, the packets classified according to the 2-tuple may be transmitted to different second intrusion detectors according to the classification, and when the intrusion detection system includes the plurality of network processors, the plurality of second intrusion detectors may perform intrusion detection on the packet payload using different network processors.

Further, when the intrusion detection system includes the plurality of second intrusion detectors, as illustrated in FIG. 2, the classification is performed according to the streams by adding a final position of the source IP address of the stream generated according to the 2-tuple to a final position of the destination IP and performing a modular operation thereon, thereby improving the efficiency of intrusion detection.

In addition, in accordance with the embodiment of the present invention, in the performing of the intrusion detection on the packet header through the first intrusion detector, the intrusion detection is performed on the packet header using the network processor, which performs high-speed processing using a micro code, among the plurality of network processors included in the intrusion detection system, and in the performing of the intrusion detection on the packet payload through the second intrusion detector, intrusion detection is performed on the packet payload using a network processor that applies deep packet inspection, among the plurality of network processors included in the intrusion detection system, thereby improving the intrusion detection speed.

According to the intrusion detection system and method of the present invention, intrusion detection is performed in a network processor having different characteristics by dividing the packet into the packet header and the packet payload for processing the high-speed packet in a network environment such as a backbone.

While the present invention has been described with reference to specific embodiments, it will be apparent to those skilled in the art that various changes and modifications may be made without departing from the spirit and scope of the invention as defined in the following claims.

What is claimed is:

1. An intrusion detection system, comprising:
a first intrusion detector, configured to use a first network processor to perform intrusion detection on layer 3 and layer 4 of a protocol field, among information included in a packet header of packets transmitted to the intrusion detection system, and when no intrusion is detected, classify the packets according to stream and transmit the classified packets to a second intrusion detector; and
a second intrusion detector, configured to use a second network processor to perform intrusion detection through deep packet inspection (DPI) for the packet payload of the packets transmitted from the first intrusion detector,
wherein the first intrusion detector generates the streams according to a 5-tuple based on packet header information of the packets to again perform the intrusion detection on each of the generated streams when the intrusion detector for the packet header is completed, and again generates the streams according to the 2-tuple based on the packet header information of the packets to perform the classification according to stream when no intrusion is detected in each of the generated streams.

2. The intrusion detection system of claim 1, wherein the first intrusion detector drops the transmitted packets so as, not to perform the deep packet inspection of the second intrusion detector when an intrusion is detected in, a protocol field of layer 3 and layer 4 of the packet header.

3. The intrusion detection system of claim 1, further comprising: a plurality of second intrusion detectors connected in parallel, wherein the first intrusion detector transmits the, packets to different second intrusion detectors in correspondence with classification of the packets according to stream so as to perform the deep packet inspection in parallel.

4. The intrusion detection system of claim 3, wherein the plurality of second intrusion detectors each comprise a second network processor for performing the intrusion detection through the deep packet inspection.

5. The intrusion detection system of claim 1, wherein the first network processor comprises a network processor performing, high-speed processing on the packet header through a micro code, and
the second network processor comprises a network processor applying deep packet inspection for a packet payload.

6. The intrusion detection system of claim 1, wherein the first intrusion detector detects layer 4 DDoS and layer 7 DDoS for a source IP of the stream generated according to the 5-tuple to again perform the intrusion detection.

7. The intrusion detection system of claim 1, wherein the first intrusion detector adds a final position of the source IP address of the streams generated according to the 2-tuple to a final position of the destination IP, and then performs a modular operation thereon to perform the classification according to stream and transmit classified packets to the second intrusion detector.

8. An intrusion detection method of an intrusion detection system including a first intrusion detector and a second intrusion detector, the intrusion detection method comprising:
performing intrusion detection on layer 3 and layer 4 of a protocol field, among information included in a packet header of a packet transmitted to the intrusion detection system, by allowing the first intrusion detector to use a first network processor;
classifying the packets according to stream by the first intrusion detector and transmitting the classified packets to the second intrusion detector when no intrusion is detected as a result of performing the intrusion detection; and
performing intrusion detection through deep packet inspection (DPI) for a packet payload of the packet transmitted from the first intrusion detector by allowing the second intrusion detector to use a second network processor;
wherein the first intrusion detector generates the streams according to a 5-tuple based on packet header information of the packets to again perform the intrusion detection on each of the generated streams when the intrusion detector for the packet header is completed, and again generates the streams according to the 2-tuple based on the packet header information of the packets to perform the classification according to stream when no intrusion is detected in each of the generated streams.

9. The intrusion detection method of claim 8, wherein the transmitting the packets to the second intrusion detector comprises dropping the transmitted packets so as not to perform the deep packet inspection of the second intrusion detector, when an intrusion is detected in a protocol field of layer 3 and layer 4 of the packet header.

10. The intrusion detection method of claim 8, wherein the transmitting the packets to the second intrusion detector comprises transmitting, by the first intrusion detector, the packets to any one of the plurality of second intrusion detectors included in the intrusion detection system in correspondence with the classification of the packets according to stream, and
the performing of the intrusion detection through the deep packet inspection comprises performing, by the plurality of second intrusion detectors, intrusion detection in parallel through deep packet inspection.

11. The intrusion detection method of claim 8, wherein the performing the intrusion detection through the deep packet inspection comprises using, by the plurality of second intrusion detectors, a second network processor included in each of the second intrusion detectors to perform the intrusion detection in parallel through the deep packet inspection.

12. The intrusion detection method of claim 8, wherein the transmitting the packets to the second intrusion detector comprises:
   generating, by the first intrusion detector, the streams according to a 5-tuple based on packet header information of the packets and again performing the intrusion detection on each of the generated streams generated according to the 5-tuple, when the intrusion detection for the packet header is completed;
   again generating, by the first intrusion detector, the streams according to the 2-tuple based on the packet header information of the packets, when no intrusion for each of the generated streams is detected; and
   classifying, by the first intrusion detector, the packets according to each of the generated streams according to the 2-tuple to transmit the classified packets to the second intrusion detector.

13. The intrusion detection method of claim 8, wherein the performing the intrusion detection on the protocol field comprises:
   performing the intrusion detection on the protocol field of layer 3 and layer 4 among information included in the packet header of the packet transmitted to the intrusion detection system by using the first network processor performing a high-speed processing through a micro code; and
   the performing the intrusion detection through the deep packet inspection comprises:
   using, by the second intrusion detector, the second network processor applying the deep packet inspection to perform the intrusion detection through the deep packet inspection on the packet payload of the packets transmitted from the first intrusion detector.

14. The intrusion detection method of claim 12, wherein the again performing the intrusion detection on each of the generated streams generated according to 5-tuple comprises again performing the intrusion detection by detecting layer 4 DDoS and layer 7 DDoS for a source IP of the streams generated according to the 5-tuple.

15. The intrusion detection method of claim 12, wherein the transmitting the packets to the second intrusion detector comprises adding a final position of a source IP address of the streams generated according to the 2-tuple to a final position of a destination IP, and then performing a modular operation thereon to perform the classification according to stream and transmit the classified packets to the second intrusion detector.

* * * * *